United States Patent
Singhvi

(10) Patent No.: US 11,641,537 B2
(45) Date of Patent: May 2, 2023

(54) CONSUMER MOBILE APPLICATION FOR THREE WAY COMMUNICATION

(71) Applicant: Honeywell International Inc., Morris Plains, NJ (US)

(72) Inventor: Shalu Singhvi, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 162 days.

(21) Appl. No.: 17/247,108

(22) Filed: Nov. 30, 2020

(65) Prior Publication Data

US 2022/0174375 A1    Jun. 2, 2022

(51) Int. Cl.
*H04Q 9/00* (2006.01)
*H04W 4/14* (2009.01)

(52) U.S. Cl.
CPC .............. *H04Q 9/00* (2013.01); *H04W 4/14* (2013.01); *H04Q 2209/40* (2013.01); *H04Q 2209/823* (2013.01)

(58) Field of Classification Search
CPC .......... G01D 4/00; H04L 12/14; G06Q 50/06; H04Q 9/00; H04W 4/14
See application file for complete search history.

(56) References Cited

U.S. PATENT DOCUMENTS

2010/0274405 A1* 10/2010 Thomas .................... H02J 3/14
                                                            700/295
2019/0383865 A1* 12/2019 Sim .................... H04L 12/2825
2022/0207280 A1*  6/2022 Aiello ................... G06Q 50/06

FOREIGN PATENT DOCUMENTS

CN    105023415 A    11/2015
CN    108769220 A    11/2018
KR   20150139690 A    12/2015

OTHER PUBLICATIONS

Gaikwad, et al., "Smart Electricity Meter System using Near Field Communication (NFC)", International Journal of Engineering Science and Computing, May 2017, p. 12324-12326 (3 pages total).

* cited by examiner

*Primary Examiner* — Qutbuddin Ghulamali
(74) *Attorney, Agent, or Firm* — John Maldjian; Stevens & Lee PC

(57) ABSTRACT

Embodiments relate to a closed loop communication system. The system can include a consumer mobile device configured with a mobile application to identify its load consumption pattern and communicate the identified load consumption pattern to a utility device. The mobile device also sets a limit for maximum energy consumption through the mobile application. The system can also include the utility device that receives the identified load consumption pattern, and configured to send a short message service (SMS) alert to the mobile device to alert the mobile device to read meter energy consumption reading from energy meter and share with utility device due to direct connection failure with an energy meter. The system can also include an energy meter configured to communicate with the utility device, wherein the utility device attempts to receive the meter energy consumption reading from the energy meter.

18 Claims, 3 Drawing Sheets

CONSUMER MOBILE APPLICATION FOR THREE WAY COMMUNICATION

TECHNICAL FIELD

The present disclosure generally relates to three-way communication system. More specifically, the present invention provides a system for a three-way communication between a consumer, utility device, and an energy meter.

BACKGROUND

Currently, communication systems are a two-way communication between a meter and a utility. The consumer does not understand his/her consumption pattern for better load management. Further, if the consumer is away from home for a long period of time, the consumer also will not be able to understand the load consumption pattern so that the utility can be updated so that the utility can forecast the demand and provide better energy management.

Another drawback is that the consumer also does not have any means with which to understand his/her load pattern. The information with the load pattern is limited to the utility and the energy meter. In such an instance, only the utility can control the consumer load, which can thereby add to extra complexity in the design and add to load management relay.

The consumer as of now may not have any means with which to know his/her energy consumption. The energy meters can be installed in isolated spaces that are far away from the consumer. As a result, the consumer cannot reach the energy meter to know the energy consumption. The consumer only knows of the energy consumption after the bill is generated. The bill can also create a conflict between the consumer and the utility if the consumer receives a bill that is larger than what was originally expected.

Accordingly, there is a need for the consumer to be able to communicate with the utility. The consumer should be able to inform the utility when he/she is to be away from home, and also share with the utility an expected load consumption pattern and likely energy consumption. The consumer being able to communicate with the utility can enable the consumer to plan and understand his/her load consumption.

Therefore, it is imperative to have the consumer be able to communicate an expected load consumption pattern to the utility, and also have the utility inform the consumer of the energy consumption so that the consumer can plan his/her load accordingly and be aware of the energy consumption.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

In an embodiment, a closed loop communication system is illustrated. The system can include a consumer mobile device (mobile device) configured with a mobile application to visualize its load consumption pattern and communicate the identified load consumption pattern to a utility device to enable self-load management. The consumer mobile device is configured to set a limit for maximum energy consumption and also include a peak hours slab cross warning through the mobile application. The maximum energy consumption is a highest amount of energy consumption. The system can also include the utility device configured to receive the load consumption from the energy meter and mobile device and send the mobile device a short message service (SMS) alert to alert the mobile device of its meter energy consumption reading. The utility device sends the SMS alert to the mobile device to request the mobile device's energy consumption reading due to a direct connection failure with the energy meter. The system can also include an energy meter configure to communicate with the utility device. The utility device attempts to communicate the meter energy consumption reading from the energy meter.

In an embodiment of the closed loop communication system, the energy meter is unable to communicate with the utility device due to an improper network.

In an embodiment of the closed loop communication system, the mobile device receives the SMS alert from the utility device when a threshold of the maximum energy consumption is reached and the peak hour slab is crossed.

In an embodiment of the closed loop communication system, the mobile device, through the mobile application, notifies the utility device of a power outage to minimize a breakdown time period.

In an embodiment of the system, the mobile device, through the mobile application, can send prior information onto the utility device when the mobile device is away from its home area.

In another embodiment, a closed loop communication system can be illustrated. The system can include a consumer mobile device (mobile device) configured to identify its load consumption pattern, determine a maximum level of its load consumption pattern, and send information regarding the identified load consumption pattern to a utility device. The system can also include the utility device configured to receive the identified load consumption pattern, determine if a threshold of a maximum energy consumption has been reached, attempt to contact an energy meter regarding a meter energy consumption reading, and send an alert to the mobile device regarding the threshold of the load consumption pattern. The system can also include the energy meter configured to communicate with the utility device regarding the load consumption pattern.

In an embodiment of the closed loop communication system, the utility device determines if an improper network connection requires the utility device to send a short message service (SMS) alert to the mobile device.

In an embodiment of the closed loop communication system, a utility device attempts to notify the consumer mobile device when the threshold of the maximum energy consumption has been reached and the peak hours slab crossed.

In an embodiment of the closed loop communication system, the mobile device is configured to share its meter energy consumption reading to the utility device due to an improper network connection with the energy meter.

In another embodiment, a method includes identifying a load consumption pattern by a consumer mobile device (mobile device). The method can also include setting a limit for maximum energy consumption through a mobile application by the mobile device, wherein the maximum energy consumption is a highest amount of energy consumption. The method also includes communicating, by the mobile device, the identified load consumption pattern to a utility device. Further, the method includes receiving, by the utility device, the load consumption pattern from the mobile device, and sending, by the utility device, a short message service (SMS) alert to alert the mobile device of its meter energy consumption reading and peak hours slab crossing, wherein the utility device sends the SMS alert to the mobile device to share the mobile device's meter energy consumption reading due to direct connection failure between the utility device and an energy meter. The method also includes configuring the energy meter to communicate with the utility device. The utility device attempts to communicate the meter energy consumption reading from the energy meter.

BRIEF DESCRIPTION OF THE FIGURES

The accompanying figures, in which like reference numerals refer to identical or functionally-similar elements throughout the separate views and which are incorporated and form a part of the specification, further illustrate the present invention and, together with the detailed description of the invention, serve to explain the principles of the present invention.

Figure 1:
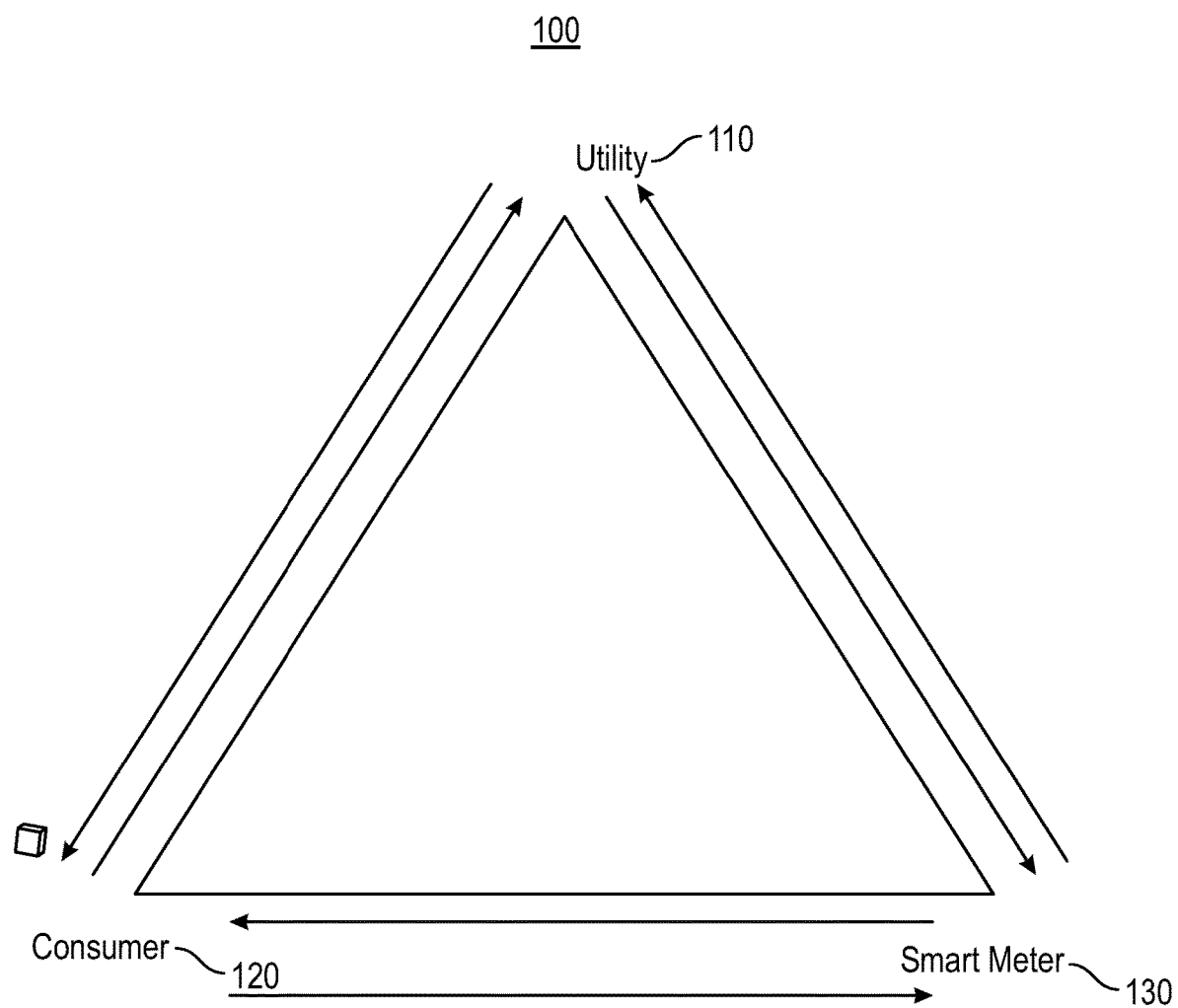
FIG. 1 illustrates a diagram of a three-way communication system, which can be implemented in accordance with an embodiment.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The followed detailed description is therefore, not intended to be interpreted in a limiting sense.

Terminology

The following paragraphs provide context for terms found in the present disclosure (including the claims):

"Based On." As used herein, this term is used to describe factors that affect a determination without otherwise precluding other or additional factors that may affect that determination. More particularly, such a determination may be solely "based on" those factors or based, at least in part, on those factors.

The example embodiments described herein can be implemented in a system to enable a consumer using an mobile application through a mobile device to be able to communicate to a utility device when the utility device has an improper network connection with an energy meter.

Aspects of the present invention are described below with reference to flowchart illustrations and/or block diagrams of methods, and systems according to the disclosed embodiments. Each block of the flowchart illustration and/or block diagrams, and combinations of blocks in the flowchart illustrations and/or block diagrams, can be implemented by various means.

Introduction

The present invention includes a closed loop communication system involving a consumer using a mobile application within a mobile device. Through the mobile application, the consumer can set a load consumption pattern. The load consumption pattern can be the energy that the consumer typically uses, and also plans to use in the future. The consumer, using the mobile application, can use the load consumption pattern for better load management of his/her own. In other words, the consumer can use the mobile application to identify the load consumption pattern and have better load management.

The consumer can also set a maximum energy consumption. The maximum energy consumption can be the highest level or limit for energy consumption that the consumer would want to use, and a peak hour slab cross warning to alert the consumer when the peak hours of the energy use have occurred. The maximum energy consumption limit and peak hour alters can help consumer to do self-load management and optimize the bill, which in turn help utility to do better demand response during peak hours.

When the utility device identifies when the threshold or maximum limit of the energy consumption has been reached and the peak hours slab cross warning, the utility device can send a short message service (SMS) alert to the mobile device to alert the consumer that the threshold for the energy consumption has been reached and that the peak hours slab has been crossed. The consumer can have instant and direct access to the utility regarding updates on its energy consumption.

The utility device can also inform the consumer of the meter energy consumption reading. The utility device may first attempt to reach the energy meter that is configured within the system. However, the utility device may not be able to communicate with the energy meter due to an improper network connection. The improper network can include the energy meter not be able to send or receive information to the utility device. In response to the improper network connection with the energy meter, the utility device can send an SMS alert to the consumer's mobile device. As a result, the consumer will read the energy consumption reading from energy meter via NFC/Wi-Fi/Bluetooth communication and share with utility device for the consumer's billing purposes.

System Structure

FIG. 1 illustrates diagram of a closed loop communication system (system) 100 which can be implemented in accordance with an embodiment. The system 100 can include a utility device 110, a consumer 120 using a mobile device, wherein the mobile device 120 is configured with a mobile application. In addition, the system 100 can also include an energy meter 130.

In FIG. 1, the consumer 120 can use the mobile application within the mobile device to identify a load consumption pattern. Moreover, the consumer 124) can visualize the load consumption pattern. The consumer can identify through the mobile application the load that has been typically used, and the load consumption that is likely to be used in the future. Through the mobile application, the consumer 120 can relay this information on the load consumption pattern to the utility device 110. The consumer 120 relaying the load consumption pattern through the mobile application to the utility device 110 will enable the consumer 120 to have self-load management to manage the load consumption pattern. The consumer 120 can also determine a limit or highest level of its energy consumption. In other words, the consumer 120 can identify the maximum energy consumption. In addition, the consumer 120 can also set a peak hours slab cross warning through the mobile application. The peak hours slab can be the hours of the day in which the peak use of energy is typically used. As such, the consumer 120 can also set the peak hours slab cross warning. Accordingly, the consumer, using the mobile application and mobile device, can relay this information to the utility device 110. Moreover, the consumer 120 can inform the utility device 110 of the load consumption pattern, maximum energy consumption, and peak hours slab cross warning when the consumer 120 plans to be away from a home location with the mobile device. In addition, the consumer 120 can use the mobile application on the mobile device to notify the utility device of a power outage to minimize a breakdown time period. Further, the consumer 120 can notify the utility device of power theft to minimize non-technical losses.

Referring to FIG. 1, the utility device 110 can receive information from the consumer 120 that enables the utility device 110 to be aware of the consumer's 120 load consumption pattern, the consumer's maximum energy consumption, and also the peak hours slab cross warning. Further, the utility device 110 can then also alert the consumer 120 when a threshold of the maximum energy consumption has been reached and when the peak hours slab has been crossed. The utility device 110 can send an SMS alert to the consumer 120 to notify the consumer that the threshold for the maximum energy consumption has been reached and when the peak hours slab has been crossed. As such, the consumer 120 can plan his/her load accordingly when learning from the utility device 110 that the threshold of the maximum energy consumption has been reached and when the peak hours slab has been crossed.

Still in FIG. 1, the utility device 110 may have difficulty communicating with the energy meter 130. An improper network connection can prevent the utility device 110 from receiving needed information from the energy meter 130. The utility device 110 can attempt to receive the information from the energy meter 130. Such information can include the meter energy consumption reading. The utility device 110 can attempt to receive the meter energy consumption reading of the consumer 120 from the energy meter 130. However, the utility device 110 can determine an improper network connection prevents the utility device HO from communicating with the energy meter 130 and receiving the meter energy consumption reading.

In FIG. 1, the utility device 110 can then attempt to communicate with the consumer 120 directly due to the improper network connection with the energy meter 130. The utility device 110 can send the SMS alert to the consumer 120 regarding the meter energy consumption reading. The utility device 110 sends the SMS alert to request consumer 120 to read the consumer's meter energy consumption reading from energy meter 130 via NFC/Wi-Fi/Bluetooth network that will be shown through the mobile application on the mobile device. Accordingly, the consumer 120, through the mobile application on the mobile device, can share his/her meter energy consumption reading to the utility device 110 for billing purposes. The utility device 110 is able to receive the necessary information from the consumer 120 when there is an improper network connection with the energy meter 130.

Figure 2:
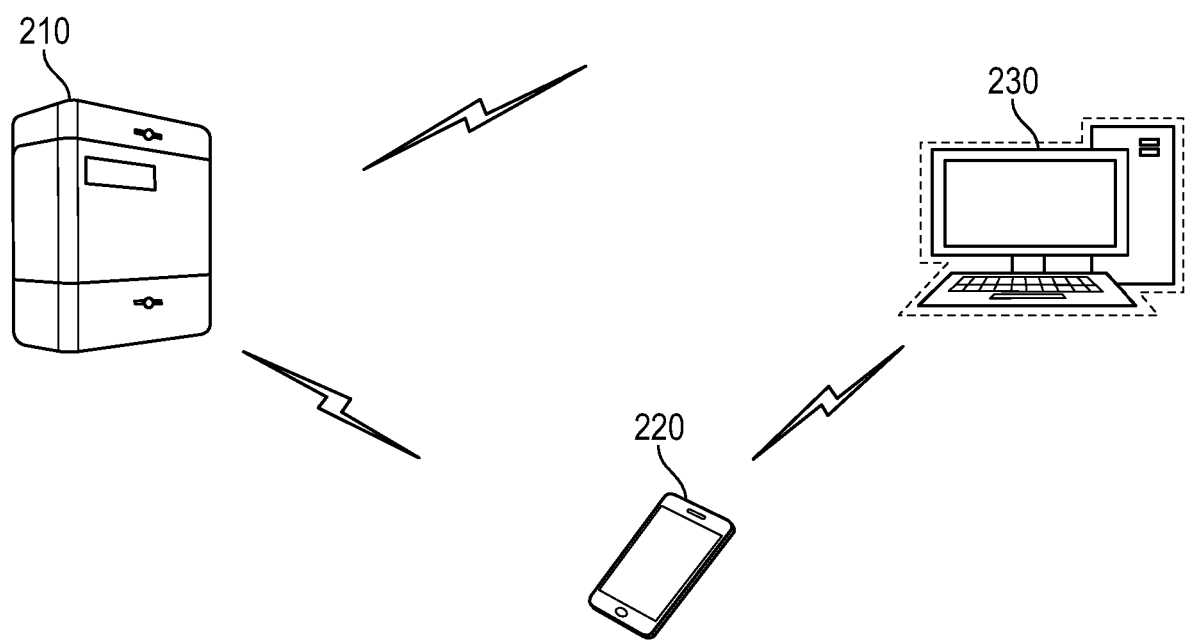
FIG. 2 illustrates another diagram of the three-way communication system in accordance with an embodiment.

FIG. 2 illustrates a schematic diagram of a closed loop communication system (system) 200. The system 200 can include a utility device 210, a mobile device 220, and an energy meter 230. The system 200 can illustrate how the utility device 210 can communicate with a consumer through the mobile device 220 when there is an improper network connection with the energy meter 230.

In FIG. 2, the consumer can utilize the mobile application within the mobile device 220 to identify and visualize its load consumption pattern. The load consumption pattern can be the energy that the consumer has used, and will likely use in the future. Moreover, the load consumption pattern can be the load management that consumer can use or plans to use. The consumer can use the mobile application to update and input this information into the mobile device 220. The consumer can communicate the identified load consumption pattern to the utility device 210 using the mobile application configured within the mobile device 220. Moreover, the consumer can communicate the load consumption pattern to the utility device 210 when the consumer plans to be away from home.

With respect to FIG. 2, the consumer can identify his/her maximum energy consumption, wherein the maximum energy consumption is the highest level of energy consumption that the consumer plans to use. In addition, the consumer can identify the peak hours slab as described above in FIG. 1. The consumer can also set both the maximum energy consumption and the peak hours slab cross warning via a mobile application configured within the mobile device 220. As a result, the consumer via the mobile device 220 can notify the utility device 210 of the maximum energy consumption and the peak hours slab cross warning. Further, the mobile device 220, through the mobile application, notifies the utility device 210 of a power outage to minimize a breakdown time period. Moreover, the mobile device 220, through the mobile application, notifies the utility device 210 of power theft to minimize non-technical losses.

Referring to FIG. 2, the utility device 210 can be aware of the consumer's limit/threshold for energy consumption and the peak hours slab cross warning. Further, the utility device 210 can send the mobile device 220 an SMS alert when the threshold of the energy consumption has been reached and the peak hours slab is crossed. As such, the utility device 210 can keep the consumer aware when the threshold of the maximum energy consumption has been reached and when the peak hours slab is crossed. The consumer can plan his/her load accordingly. As such, the consumer, through the mobile application on the mobile device 220, and the utility device 214), can be in direct communication in regard to the maximum energy consumption and the peak hours slab cross warning.

In FIG. 2, the utility device 210 can attempt to receive the meter energy consumption reading from the energy meter 230. The utility device 210 can also attempt to receive the meter energy consumption reading directly from the energy meter 230 before attempting to request this information from the consumer. Nevertheless, the utility device 210 may not be able get this information from the energy meter 230. An improper network connection between the utility device 210 and the energy meter 230 can prevent the utility device 210 to receive the meter energy consumption reading from the energy meter 230.

With respect to FIG. 2, and in response to the improper network connection with the energy meter 230, the utility device 210 can request the meter energy consumption reading to the mobile device 220. The utility device 210 can send the SMS alert to the mobile device 220 to request the consumer of the consumer's meter energy consumption reading for billing purposes. The consumer, using the mobile application within the mobile device 220, can communicate directly with the energy meter 230 via NFC/Wi-Fi/Bluetooth communication, and share meter energy consumption reading to utility device 210 for billing purposes In both FIGS. 1 and 2, the consumer is able to identify a load consumption pattern, a maximum energy consumption, and a peak hours slab cross warning. The consumer can also pass on this information to the utility device 110, 210 using a mobile application configured on the mobile device 120 for when the consumer plans to be away from home. The mobile device 220 can send the information on the load consumption pattern, the maximum energy consumption, and the peak hours slab cross warning to the utility device 110, 210. With respect to the maximum energy consumption and peak hours slab cross warning, the utility device 110, 211) can be aware as to when the threshold or highest level of the maximum energy consumption has been reached and when the peak hours slab has been crossed. Further, the utility device 110, 210 can inform the consumer when a threshold of the maximum energy consumption has been reached and when the peak hours slab has been crossed via an SMS alert being sent to the mobile device 220.

In both FIGS. 1 and 2, the utility device 110, 210 can also communicate the meter energy consumption reading directly to the consumer. An improper network connection with the energy meter 130, 230 can prevent the utility device 110, 210 from communicating directly with the energy meter 130, 230. For the utility device 110, 210 to receive the meter energy consumption reading for billing purposes, the utility device 110, 210 can communicate directly with the consumer. The consumer can receive his/her meter energy consumption reading from the energy meter 130, 230 via NFC/Wi-Fi/Bluetooth communication and share with utility device 110, 210 for billing purposes.

Figure 3:
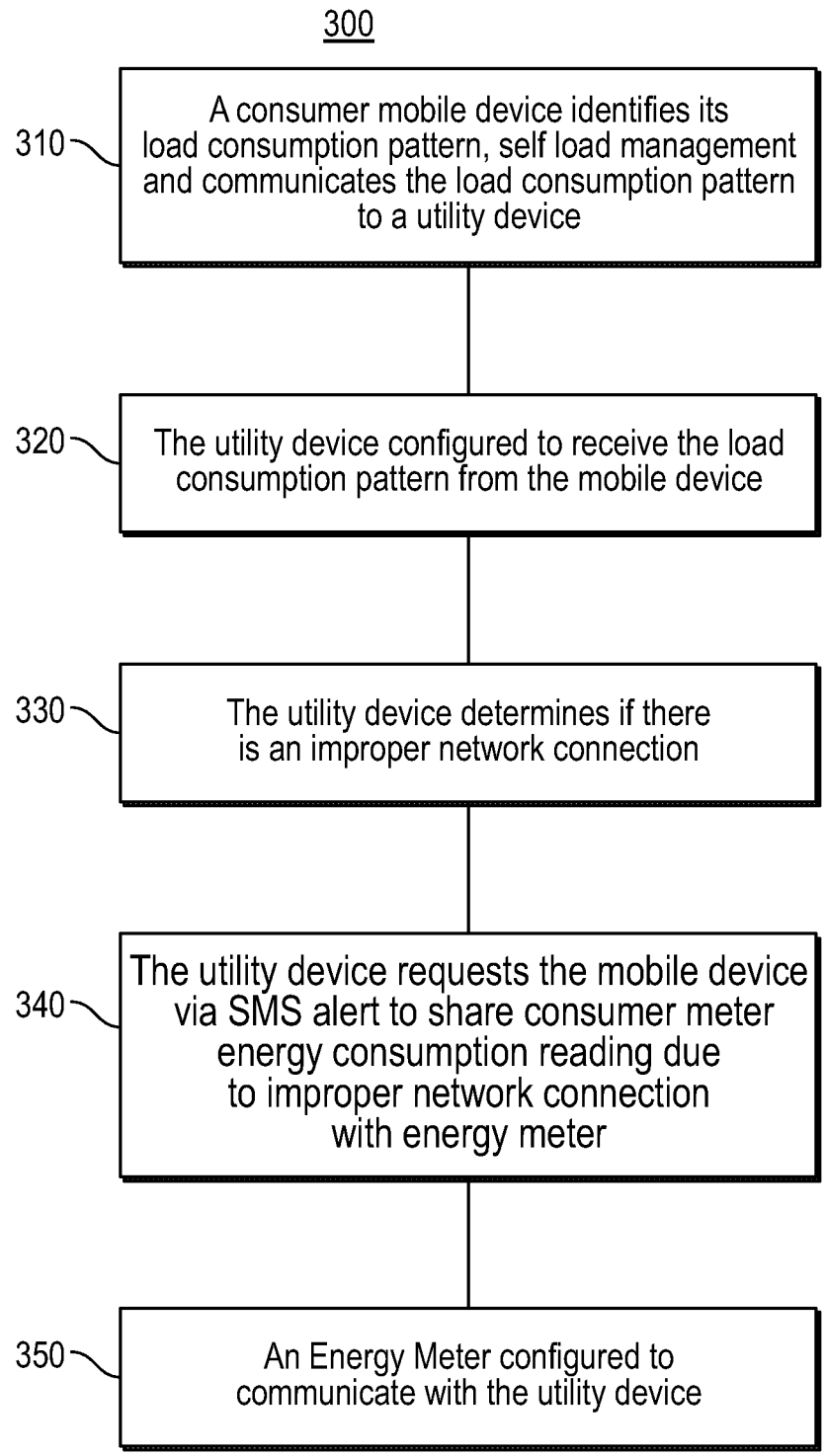
FIG. 3 illustrates a method for the three-way communication system in accordance with an embodiment.

FIG. 3 illustrates a method 300 for the consumer to communicate the load consumption pattern, the maximum energy consumption, and the peak hours slab cross warning to the utility device. In addition, the method 300 also includes the utility device informing the consumer when the threshold for the maximum energy consumption and the peak hour slab cross warning has been reached. Further, the method 300 also discloses the utility device communicating directly with the consumer to receive information regarding the meter energy consumption reading when an improper network prevents the utility device from communicating directly with the energy meter.

In FIG. 3, at step 310, the mobile device can identify its load consumption pattern. The load consumption pattern can be the energy or load that the consumer has typically used, and the load which the consumer plans to use. The consumer can use a mobile application configured within a mobile device to communicate directly to a utility device. In addition to the load consumption pattern, the mobile device can also send a maximum energy consumption and a peak hours slab cross warning (both described above in FIGS. 1 and 2) to the utility device. The maximum energy consumption can be the highest level of energy that the consumer plans to use. The peak hours slab cross warning refers to the hours in which the energy use by the consumer is at its peak. As such, the consumer can inform the utility device of the load consumption pattern, the maximum energy consumption, and the peak hour slab cross warning prior to when the consumer plans to be away from home with the mobile device.

In FIG. 3, at step 320, the utility device can receive the load consumption pattern and the peak hours slab cross warning. The utility device can be made aware of the consumer's maximum energy consumption. The utility device can also note when the threshold of the maximum energy consumption is reached.

In FIG. 3, at step 330, the utility device can determine if there is an improper network. The utility device can attempt to receive a meter energy consumption reading from the energy meter within the system. The utility device can determine if it is able to receive the meter energy consumption reading from the energy meter.

Referring to FIG. 4, at step 340, the utility device can send an SMS alert to the consumer through the mobile application on the mobile device to request consumer to share the meter energy consumption reading. The utility device can send the SMS alert to communicate directly with the consumer because the utility device cannot communicate directly with the energy meter due to an improper network connection. As a result, the consumer can read the meter energy consumption reading from energy meter via NFC/Bluetooth/Wi-fi communication and provide information to utility device when an improper network connection prevents the utility device from communicating with the energy meter.

In FIG. 3, at step 350, the energy meter is configured to communicate directly with the utility device and the consumer. The energy meter can be configured to communicate with the utility device to enable the utility device to receive the meter energy consumption reading from the energy meter. As such, as described above in step 340, the utility device can communicate directly with the consumer to request the meter energy consumption reading when an improper network error prevents the utility device from communicating with the energy meter.

In summary, a consumer can use a mobile application within a mobile device to identify and plan his/her load consumption pattern. The consumer can communicate the identified load consumption pattern to a utility device when the consumer plans to be away from home. The consumer can also identify the highest level or maximum energy consumption that is planned and the peak hours slab cross warning to account for the consumer's peak hours of energy use. The consumer can also inform the utility device of the maximum energy consumption and the peak hours slab cross warning when the consumer plans to be away from home with his/her mobile device.

The utility device can send a SMS alert to the consumer when the threshold of the maximum energy consumption is reached and the peak hours slab is crossed to enable the consumer to plan his/her load accordingly. The utility device can also request the meter energy consumption reading directly from the consumer if an improper network connection prevents the utility device from obtaining the meter energy consumption reading directly from the energy meter.

Those skilled in the art will appreciate that the example embodiments are non-exhaustive and that embodiments other than that described here may be included without departing from the scope and spirit of the presently disclosed embodiments.

Conclusion

All references, including granted patents and patent application publications, referred herein are incorporated herein by reference in their entirety.

What is claimed is:

1. A closed loop communication system comprising:
a consumer mobile device (mobile device) configured with a mobile application to visualize load consumption pattern of energy used by a consumer and communicate the identified load consumption pattern to a utility device to enable self-load management, wherein the mobile device is configured to set a limit for maximum energy consumption based on the identified load consumption pattern including a peak hours slab cross warning through the mobile application, wherein the maximum energy consumption is a highest amount of energy consumption;
the utility device configured to receive the identified load consumption pattern from the mobile device and send the mobile device a short message service (SMS) alert to alert the mobile device of meter energy consumption reading, wherein the utility device sends the SMS alert to the mobile device to send the mobile device's meter energy consumption reading due to direct connection failure with the energy meter; and
the energy meter configured to communicate with the utility device, wherein the utility device attempts to communicate the meter energy consumption reading from the energy meter.

2. The closed loop communication system of claim 1, wherein the mobile device receives the SMS alert from the utility device when a threshold of the maximum energy consumption is reached and the peak hours slab is crossed.

3. The closed loop communication system of claim 1, wherein the mobile device, through the mobile application, notifies the utility device of a power outage to minimize a breakdown time period.

4. The closed loop communication system of claim 1, wherein the utility device directly communicates the meter energy consumption reading with either the mobile device or the energy meter.

5. The closed loop communication system of claim 1, wherein the utility device sends the SMS alert to the mobile device to enable the mobile device to plan the load consumption.

6. The closed loop communication system of claim 1, wherein the mobile device, through the mobile application, can send information onto the utility device when the mobile device is away from home area of the consumer.

7. A closed loop communication system comprising:
a consumer mobile device (mobile device) configured to identify its load consumption pattern, determine a maximum level of load consumption pattern of energy used by a consumer, and send information regarding the identified load consumption pattern to a utility device;
the utility device configured to receive the identified load consumption pattern, determine if a threshold of the load consumption pattern has been reached, and send an alert to the mobile device regarding the threshold of the load consumption pattern; and
an energy meter configured to communicate with the utility device regarding the load consumption pattern.

8. The closed loop communication system of claim 7, wherein the utility device attempts to notify the mobile device (120) when the threshold of the maximum energy consumption has been reached and peak hours slab crossed.

9. The closed loop communication system of claim 7, wherein the mobile device sets the threshold for the load consumption pattern through a mobile application configured within the mobile device.

10. The closed loop communication system of claim 7, wherein the mobile device is configured to receive meter energy consumption reading from the utility device due to an improper network connection with the energy meter.

11. The closed loop communication system of claim 7, wherein the mobile device sends information to the utility device when the mobile device is away from a home location for a longer duration than normal, wherein the utility device is configured to use the information to plan an improved demand response.

12. The closed loop communication system of claim 7, wherein the utility device enables the mobile device to plan the load consumption pattern.

13. A method comprising:
identifying a load consumption pattern by a mobile device;
setting a limit for maximum energy consumption based on the identified load consumption pattern through a mobile application by the mobile device, wherein the maximum energy consumption is a highest amount of energy consumption;
communicating, by the mobile device, the identified load consumption pattern to a utility device;
receiving, by the utility device, the load consumption pattern from the mobile device, and sending, by the utility device, a short message service (SMS) alert to alert the mobile device of meter energy consumption reading and peak hours slab crossing, wherein the utility device sends the SMS alert to the mobile device to send the mobile device's meter energy consumption reading due to direct connection failure between the utility device and an energy meter;
configuring the energy meter to communicate with the utility device, wherein the utility device attempts to communicate the meter energy consumption reading from the energy meter.

14. The method of claim 13, wherein the mobile device, through the mobile application, notifies the utility device of power theft to minimize non-technical losses.

15. The method of claim 13, further comprising:
determining, by the utility device, whether the utility device has to directly communicate the meter energy consumption reading directly to the mobile device.

16. The method of claim 13, wherein the utility device attempts to inform the consumer mobile application that a threshold of the maximum energy consumption has been reached.

17. The method of claim 13, wherein the utility device directly provides the mobile device with billing information.

18. The method of claim 13, further comprising:
notifying the utility device for disconnecting the home load by the mobile device through the mobile application when the mobile device is away from a home location for a longer period to enable the utility device to prepare an improved demand response.

* * * * *